Feb. 24, 1959 — E. A. QUADE — 2,875,429

PHASE SENSITIVE MAGNETIC HEAD

Filed Jan. 28, 1957

INVENTOR.
EDWARD A. QUADE

BY Lippincott & Smith

ATTORNEYS

United States Patent Office 2,875,429

Patented Feb. 24, 1959

2,875,429

PHASE SENSITIVE MAGNETIC HEAD

Edward A. Quade, San Jose, Calif., assignor to International Business Machines Corporation, New York, N. Y., a corporation of New York Application January 28, 1957, Serial No. 636,642

3 Claims. (Cl. 340—174)

Figure 1:
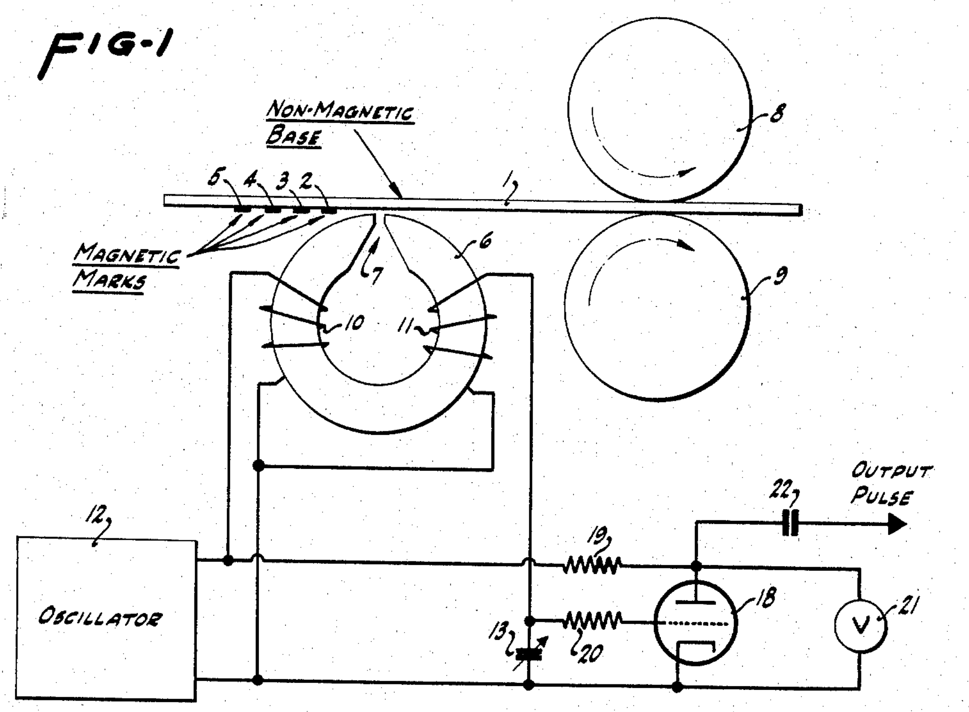

This invention relates to read-out apparatus for producing electric signals from magnetic marks that represent coded data.

One system for recording coded data upon paper tape, checks, business forms, and other non-magnetic base materials comprises the placing of magnetic marks upon the non-magnetic base in certain positions in certain patterns to represent the coded information. The marks may be made with magnetic ink, magnetic carbon paper, or any other appropriate means for depositing small magnetic bodies upon the surface of paper or other non-magnetic base materials. To recover or read out the recorded information, the base material is moved across or is otherwise brought into proximity to one or more read-out heads that must respond to the presence of the magnetic marks. The object of this invention is to provide improved read-out apparatus for such data-recording systems.

Briefly stated, in accordance with certain aspects of this invention, each read-out head includes a small magnetic core containing a gap, and means responsive to changes in the reluctance of the core for detecting the presence of a magnetic mark adjacent to the gap. The core is energized with alternating magnetic flux at a fixed frequency. A winding on the core is connected in a resonant circuit that is resonant at a frequency slightly higher than the excitation frequency of the core in the absence of any magnetic body adjacent to the gap. Whenever a magnetic mark is positioned adjacent to the gap, the reluctance of the core decreases, the inductance increases, and the resonant frequency of the resonant circuit decreases to a value somewhat lower than the excitation frequency of the core. Thus, the excitation frequency of the core and the resonant frequency of the resonant circuit are differently related to each other depending upon whether or not there is a magnetic mark adjacent to the core gap.

In the improved read-out apparatus, advantage is taken of the fact that certain voltage and current phase relationships in a resonant circuit change rapidly with small changes in the relative values of the excitation and resonant frequencies. An electric signal taken from a portion of the resonant circuit is continuously compared in phase with a supply signal used to excite the core, and the phase-comparing means provides an electric signal that changes in value as each magnetic mark crosses the gap of the read-out head.

Figure 2:
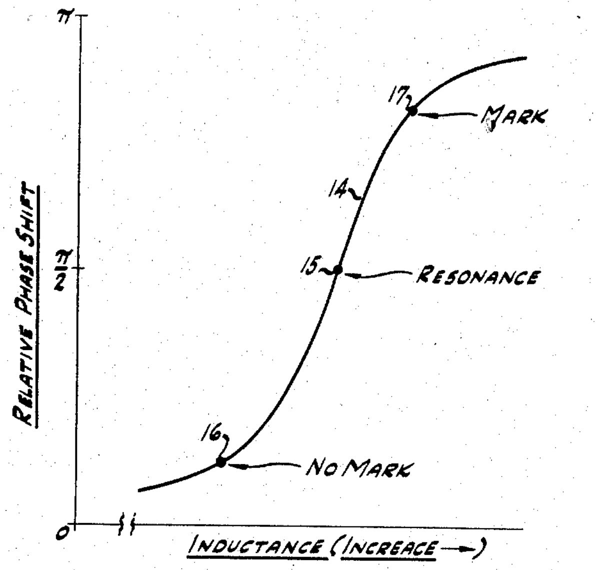

The invention will be better understood from the following detailed description of an illustrative embodiment taken in connection with the accompanying drawing, and its scope is pointed out in the appended claims. In the drawing:

Fig. 1 is a schematic representation of apparatus embodying principles of this invention; and Fig. 2 is a graphical representation of relative phase shift versus the inductance of the read-out head.

Referring to Fig. 1 of the drawing, a non-magnetic base 1 may be a paper tape, a check, a business form, a datastorage card for use in business machines, or any other non-magnetic element upon which information may be recorded. Magnetic marks 2, 3, 4 and 5 are small bodies of magnetic material deposited upon the surface of base 1 by any suitable means. For example, the magnetic marks may be made by writing upon base 1 with a pen filled with magnetic ink, or by writing with a stylus through magnetic carbon paper, or by any other writing mechanism that deposits magnetic particles upon the surface of base 1.

A magnetic read-out head includes a small toroidal core 6 of magnetic material such as a ferrite. Core 6 has a small air gap 7, as in the usual construction of magnetic recording and read-out heads. To form electric signals from the magnetic marks, base 1 is moved across the read-out head by any suitable means, such as the two rollers 8 and 9, to move successive ones of the magnetic marks across gap 7 in the customary manner. If desired, the magnetic marks may be arranged in several parallel columns on the surface of base 1, and several side-by-side read-out heads may be employed for simultaneously reading the data recorded in each column.

In the preferred form of the invention, there are two windings upon core 6: a primary 10 and a secondary 11. Primary 10 is connected to a source of alternating current such as oscillator 12, which produces within core 6 an alternating magnetic flux at a fixed excitation frequency. For example, the excitation frequency may be about 40 kc. (kilocycles per second). The alternating magnetic flux induces an alternating voltage in secondary 11. A capacitor 13 connected across secondary 11, forms a high-Q resonant circuit. In general, the sensitivity of the read-out apparatus increases directly as the Q of the circuit, and for high sensitivity the Q should be made as high as is reasonably practical.

Capacitor 13 is adjusted to tune the circuit comprising winding 11 and capacitor 13 to resonance at a frequency slightly higher than the excitation frequency provided by oscillator 12 in the absence of any magnetic body adjacent to gap 7. Whenever any one of the magnetic marks 2 through 5 moves across gap 7, the reluctance of core 6 decreases momentarily and the inductances of windings 10 and 11, as well as the mutual inductance between the two windings, increase correspondingly. The increased inductance when a magnetic mark is adjacent to gap 7 lowers the resonant frequency of the resonant circuit to a value below the excitation frequency provided by oscillator 12.

In other words, each time that a magnetic mark crosses gap 7, the circuit comprising winding 11 and capacitor 13 passes through resonance from the "no-mark" condition in which the excitation frequency is below the resonant frequency to a "mark" condition in which the excitation frequency is above the resonant frequency. It should be noted that these changes in the relation of the excitation and resonant frequencies are produced by shifts in the resonant frequency as the magnetic mark crosses the gap, while the excitation frequency remains constant. Consequently, a single oscillator 12 can be used as a supply source for a plurality of read-out heads having their primaries connected together either in parallel or in series.

The phase relation between the alternating voltage across capacitor 13 and the alternating voltage across the output terminals of oscillator 12 changes by almost 180 degrees ($\pi$ radians) as the value of the excitation frequency relative to the resonant frequency changes from one side of resonance to the other side of resonance. In Fig. 2, curve 14 represents the relative phase shift as a function of the read-out head inductance. At resonance, the current through secondary 11 is approximately in phase with the supply voltage across primary 10. However, the voltage across capacitor 13 lags the secondary current. Consequently, there is a phase shift of approximately 90 degrees ($\pi/2$ radians) between the supply voltage and the voltage across capacitor 13. Resonance is represented by point 15 in Fig. 2.

In the absence of any magnetic body adjacent to gap 7, the resonant frequency is slightly higher than the excitation frequency, and the secondary currents leads the supply voltage. Thus, under "no mark" conditions there is a phase shift of only a few degrees between the supply voltage and the voltage across capacitor 13. "No mark" conditions are represented in Fig. 2 by point 16.

Whenever one of the magnetic marks 2 through 5 crosses gap 7, the resonant frequency momentarily becomes lower than the supply frequency, and the secondary current then leads the supply current. Under such a "mark" condition, there is a much larger phase shift between the supply voltage and the voltage across capacitator 13. "Mark" conditions are represented in Fig. 2 by point 17.

It is evident that the phase relation between the supply voltage and the voltage across capacitor 13 changes by a large amount each time that one of the magnetic marks crosses gap 7. When the sensitivity of the apparatus is made high (by making the Q of the resonant circuit high) the phase change between "no mark" and "mark" conditions approaches 180 degrees ($\pi$ radians).

Any of various phase comparison circuits can be used for converting the phase changes into electric signals having a more convenient form. A simple and satisfactory phase comparison circuit is shown in Fig. 1. A triode vacuum tube 18 has its cathode connected to one side of capacitor 13 and to one output terminal of oscillator 12. The plate of tube 18 is connected through a resistor 19 to the other output terminal of oscillator 12, and the control grid of tube 18 is connected through a series resistor 20 to the other side of capacitor 13. Grid current flowing through resistor 20 biases the grid of tube 18 so that the vacuum tube conducts current only during the positive peaks of the voltage across capacitor 13.

Under "no mark" conditions, the voltage across capacitor 13 is nearly in phase with the voltage across the output terminals of oscillator 12, and tube 18 is conductive approximately at the instant when its plate is most positive. Under these conditions tube 18 conducts maximum current, and the voltage drop across resistor 19 due to the current conducted by tube 18 makes the average potential of the plate substantially negative.

Under "mark" conditions, the voltage across capacitor 13 is nearly in phase opposition with the voltage across the oscillator output terminals, and tube 18 conducts minimum current. Consequently, there is a minimum voltage drop across resistor 19, and the average potential of the plate of tube 18 has a relatively positive (small negative) value.

Thus there is a change in the average potential at the plate of tube 18 each time that a magnetic mark crosses gap 7. These potential changes form output electric signals that can be supplied to any desired utilization device. By way of illustration, the potential changes may be displayed by a voltmeter 21 connected between the cathode and the plate of tube 18, as shown. In practice, an immediate display of the signals is not usually required, and output pulses formed by the changes in potential at the vacuum tube plate are supplied through a coupling capacitor 22 or the like to electronic computing or control circuits.

It will be noted that the new read-out head has a static response in the sense that the production of output signals does not depend upon relative motion between the head and the magnetic record. Consequently, it is not essential that the base 1 be in motion relative to the read-out head during a reading operation. For example, gap 7 may be brought into proximity to any selected portion of base 1 with the oscillator turned off or disconnected from the input, then, the oscillator may be turned on or connected to the input while base 1 is stationary relative to core 6, and the presence or absence of an output signal will then indicate the presence or absence of a magnetic mark at the selected location on base 1.

It should be understood that this invention in its broader aspects is not limited to the specific embodiments herein illustrated and described, and that the following claims are intended to cover all changes and modifications that do not depart from the true spirit and scope of the invention.

What is claimed is:

1. Apparatus for detecting magnetic bodies, comprising a magnetic core containing a gap, a winding upon said core, alternating current supply means for providing within said core alternating magnetic flux having a fixed frequency, means for tuning said winding to a resonant frequency that is higher than said fixed frequency in the absence of any magnetic body adjacent to said gap and is lower than said fixed frequency in the presence of a magnetic body adjacent to said gap, and phase-comparison means responsive to the relative values of said resonant frequency and said fixed frequency.

2. Apparatus for detecting magnetic bodies, comprising a magnetic core containing a gap, a primary and a secondary wound upon said core, alternating current supply means connected to provide an alternating supply voltage across said primary, a capacitor connected across said secondary to form a resonant circuit, said resonant circuit being tuned to a resonant frequency that is approximately equal to the frequency of said supply voltage, whereby there is produced across said capacitor an alternating voltage having a phase relation to said supply voltage that varies according to the proximity of magnetic bodies to said gap, and automatic phase comparison means responsive to the phase relation between the voltage across said capacitor and said supply voltage.

3. Apparatus for detecting magnetic marks on a nonmagnetic base, comprising a magnetic core containing a gap, means for moving said marks successively past said gap, a primary and a secondary wound upon said core, alternating current supply means connected to provide an alternating supply voltage across said primary, a capacitor connected across said secondary to form a resonant circuit, said resonant circuit being tuned to be resonant at a frequency lower than the frequency of said supply voltage whenever one of the magnetic marks is adjacent to said gap and higher than the frequency of said supply voltage at other times, whereby there is provided across said capacitor an alternating voltage having a phase relation to said supply voltage that varies according to the proximity of a magnetic mark to said gap, a variable-conductance device having an anode and a cathode and a control electrode, circuit means connecting said anode and said cathode to said supply means and connecting said control electrode to said capacitor so that the average amount of current conducted by said device depends upon the phase relation between said supply voltage and the voltage across said capacitor, and means responsive to the average voltage between said anode and said cathode.

References Cited in the file of this patent

UNITED STATES PATENTS 2,722,569 Loper ................ Nov. 1, 1955